May 5, 1942.　　　C. D. AUSTIN　　　2,282,151
STEREOSCOPE
Filed May 21, 1940
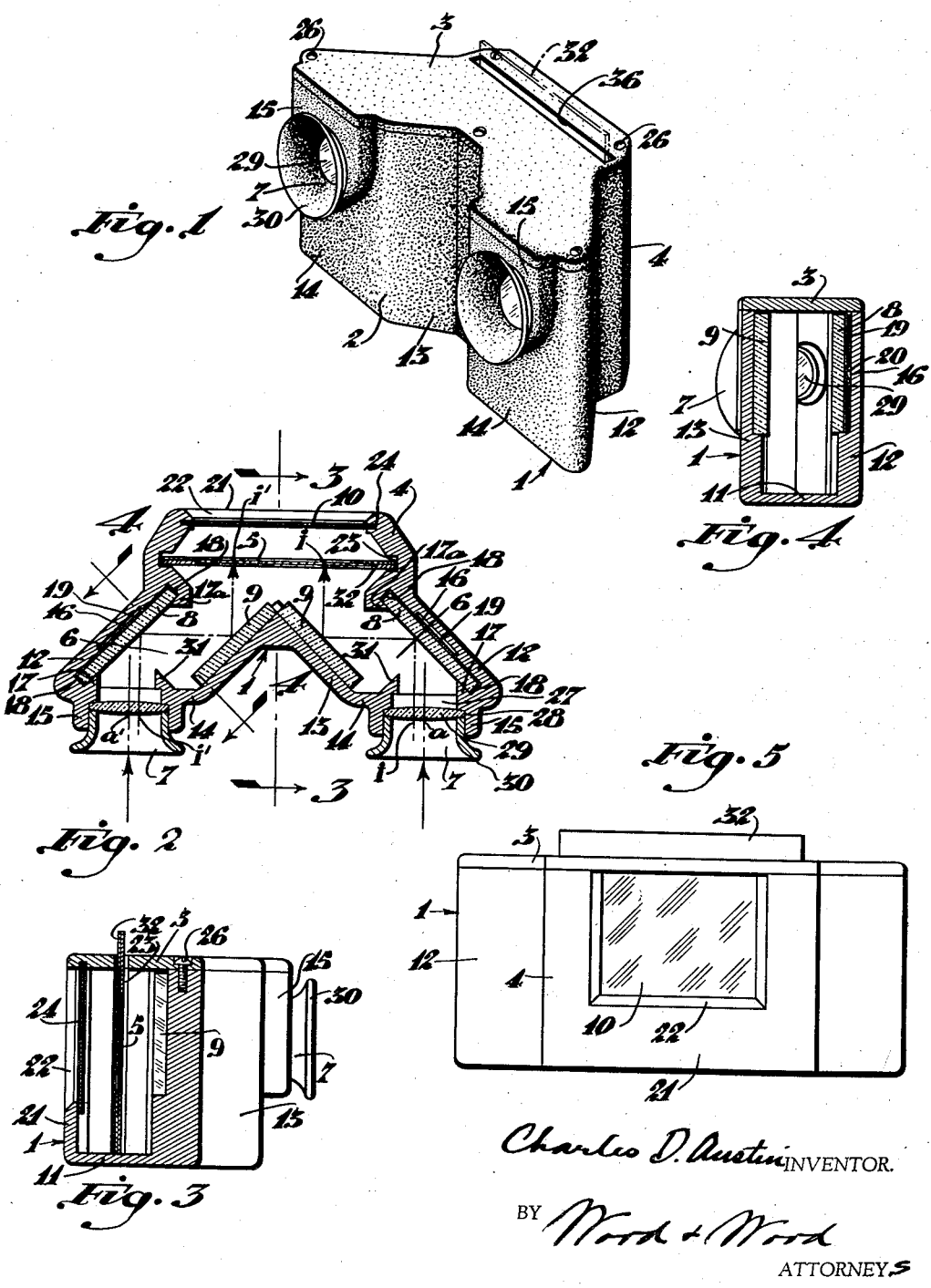

Patented May 5, 1942

2,282,151

UNITED STATES PATENT OFFICE 2,282,151

STEREOSCOPE

Charles D. Austin, Cincinnati, Ohio, assignor to Advertising Displays Incorporated, Covington, Ky., a corporation of Kentucky Application May 21, 1940, Serial No. 336,423

5 Claims. (Cl. 88—29)

This invention relates to a device for reviewing stereoscopic pictures. It is adapted particularly for exhibiting stereoscopic transparencies, for example, slide units in which a transparency on 35 mm. film or the like is held within a frame of cardboard or metal.

While the general principles of stereoscopy are old and well known in the art, the devices which heretofore have been available have required the stereoscopic pictures of a pair to be exhibited, to be spaced apart substantially the same distance as the spacing of the lenses through which they were viewed. In such an arrangement, very desirable visual effects are accomplished. However, such an organization is limited to either pictures of a very substantial size, or, otherwise, the images of a given pair must be passed in accordance with the spacing of the lenses and this in turn requires either special camera equipment or special separated mounting of the pictures.

The present invention is directed particularly to an apparatus in which small stereoscopic images spaced directly adjacent of one another can be viewed through eye-piece objectives spaced apart an average interpupillary distance. A typical transparency for which the present apparatus is adapted is one made upon 35 mm. film, with two stereoscopic images contained in the area usually devoted to a single two-dimensional image. In such an instance, identical points of the stereoscopic pair of images are spaced apart approximately three-fourths of an inch.

Briefly, therefore, the present invention contemplates an apparatus for viewing stereoscopic transparencies through eye-pieces which are spaced apart a distance substantially greater than the images of the transparencies.

The invention also is directed to the mechanical construction of an apparatus capable of providing these results conveniently and inexpensively. It has been the purpose to provide a simple device within which stereoscopic transparencies can be viewed one after another.

A further object of the invention has been to provide a viewer which is made of a plastic material and attractive in appearance, yet rugged in construction, with the optical parts once located firmly within it and therefore incapable of becoming out of adjustment relative to one another.

A still further object of the invention is to utilize surface reflecting mirrors for transmitting the light in the respective images of the transparency to the eye-pieces through which the images are viewed. In this respect, it is the object to relate the reflective surfaces angularly relative to one another so that the eye-pieces through which the images are viewed are spaced apart a distance corresponding to the interpupillary distances of the eyes whereby small transparencies in which stereoscopic images are spaced beside one another may readily be exhibited.

A typical embodiment of a structure providing these and other features is disclosed in the drawing in which:

Figure 1 is a general perspective view of the apparatus.

Figure 2 is a cross sectional view showing the interior of the construction.

Figure 3 is a sectional view taken on the line 3—3 of Figure 2.

Figure 4 is a sectional view taken on the line 4—4 of Figure 2.

Figure 5 is a rear view of the apparatus showing the aperture for admitting light to the transparency.

The housing of the device, which is indicated generally at 1 in Figure 1, is comprised of but two parts, a body 2 and a cap 3 which is of the general outline of the body and which is fastened to the top of it.

The body of the device is comprised of a rearward portion 4 in which the transparency 5 is installed, and two diverging light passageways 6—6 which communicate with the rearward portion and at their forward terminals contain eye-piece assemblies 7—7, one for each eye.

On the walls of the light passageways 6—6 the reflectors 8—8 and 9—9 respectively are mounted. These direct the course of light from the transparency to the eye-pieces. Rearwardly of the transparency 6 a translucent window 10 is located to provide general illumination over the surface of the transparency.

In accordance with the objective of providing a structure which is inexpensive and economical to manufacture, the body of the device is made of moulded plastic material, for instance, Bakelite. In this respect one of the principal features of the housing is that it is made of one piece of material with all of the parts accurately located relative to one another by virtue of the configurations of the dies in which it is moulded.

The body comprises an integral bottom wall 11 which extends over its entire lower surface. The outer side walls 12—12 extend from the bottom wall and are interconnected at the forward face of the device by a front wall 13 which contains a V-shaped indentation intermediate the marginal flat wall portions 14—14; the latter are provided with bosses 15—15 (Figure 1) within which the eye-piece assemblies are installed and the inner surfaces of the portions forming the V-shaped indentation serve to receive and support the center reflectors 9—9.

Each side wall 12 is provided with a centrally located vertical groove 15 and is also provided with endwise vertical guide portions 16 and 17. The guide portions define grooves 18—18 within which reflectors 8 are slidably mounted. A spring member 19, having a central yieldable corrugation 20 or the like, is installed in each groove 15 so as to press the reflector held within the groove against the abutment portions of the guide members and provide a firm and rugged seat therefor.

The casing 4 projects rearwardly from the side walls of the body of the housing and terminates in a back wall 21 which contains a light aperture 22.

Grooves 23 are provided in opposite wall portions of the casing for the reception of the stereoscopic transparencies, while grooves 24 likewise are provided in opposite wall portions, beyond the grooves 23 for the reception of a translucent plastic or ground glass member or window 25. The latter serves the purpose of diffusing the light entering the viewing device, and is framed within the window 25.

The upper surface of the housing terminates in a plane across which extends the cap 3. The cap is held in position by means of the screws 26 which engage the body of the structure.

Bosses 15, which are provided at the front wall portions 14 of the housing, are bored, as at 27, for the passage of light and counterbored, as at 28, to provide seats for the lens elements 29, one for each eye piece. Eye pieces which are flared as at 30 are fitted within the counterbored portions of the bosses and are located permanently in position either through press fitting or by means of cement. The eye-pieces serve the double purpose of holding the lens element in position and the purpose of spacing the eyes from the lenses when the device is being used.

Pillars 31 reside at the interior of the casing and extend rearwardly from the front wall adjacent the objective lenses. But these portions terminate in masking edges which prevent light from passing directly through the transparency and the lenses without being reflected by mirrors. Without the masks, direct vision of the images is possible, and this tends to confuse the display. The pillars 18 extend forwardly from the portion of the housing adjacent the transparencies and these likewise terminate in masking edges which cooperate with the edges of the masks 19. The latter members also are configurated to provide the grooves for marginally supporting the edges of the reflectors 8.

As shown in Figure 4, the optical axis through the device is located somewhat above the center line of the device itself. This arrangement is utilized for providing a recess within which the bottom portion of the frame of the transparency may be disposed without being visible. As illustrated in Figure 2, the transparency particularly if it be of 35 mm. size, is comprised of a pasteboard or a metal frame 32 within which the transparency is located and cemented in position. In the present construction, as shown particularly in Figure 1, in dot and dash lines, the lower portion of the frame resides in the lower portion of the housing out of view, while the upper portion extends through the slot 36 in the cap of the housing, and beyond it, so as to be grasped conveniently by the fingers when it is to be removed.

In the preferred structure, the mirrors which are utilized are of the surface reflective type, for instance, glass plates provided on their external surfaces with reflective films of aluminum or the like. Since the entire housing is enclosed except for the slot 36 through which the transparencies are installed, the structure is particularly well adapted to the use of mirrors of the type since the reflective surfaces are well protected from dust. As shown in Figure 4, aside from the sidewise support of the mirrors, the walls upon which they are installed are recessed so that the lower edges of the mirrors are seated against the bottoms of the recesses. The center mirrors 9 are held in place by means of cement.

If the lenses and mirrors of the apparatus be arranged so that light passing through identical points upon the transparency be directed to pass through the optical centers of the lenses, some persons encounter difficulty in obtaining the desirable converging of the images when they are viewed through the lenses. The display is of fuzzy, out-of-focus appearance, depending to some degree upon the characteristics of the vision of the person using the device. However, it has been determined that clear, sharp stereoscopic images are displayed, in all cases, if the lenses be somewhat separated, so that light passing through identical points of the transparencies of a pair, passes through the lenses inwardly of their optical axes. This relationship is generally indicated in Figure 3 in which $i$ and $i'$ designate identical points upon the right and left hand stereoscopic images, for instance, the point of a steeple of a church. The optical axes of the objectives are designated at $a$ and $a'$ respectively. It will be noted that the rays of light from the images $i$ and $i'$, as reflected by the mirrors, pass through the eye-piece lenses inwardly of the optical axes of them. Otherwise expressed, the rays of light passing through identical points upon the images of a stereoscopic pair are diverted by the mirrors to a degree lesser than the spacing apart of the lenses themselves. This arrangement facilitates image conversion regardless of the characteristics of the vision of the person who is using the device, and thereby improves the results which are obtained. In the use of the device a transparency which is to be viewed is inserted in the slot 21 and the device is then held to the eyes and is best pointed toward some source of light, whereby the stereoscopic images may be illuminated.

For taking stereoscopic pictures of the type adapted to be viewed with the present apparatus, attention is directed to my copending application Serial No. 322,978. The apparatus shown in that application is adapted to be attached to a camera having a single lens whereby a double picture providing stereoscopic images may be taken. The structure shown in this patent and the copending one provide a pair of units which are inexpensive to construct and open the field of stereoscopy to the typical amateur photographer, as well as to the professional, for industrial purposes.

Having described my invention I claim:

1. A device for exhibiting stereoscopic transparencies, which comprises a hollow body formed of a molded plastic material and comprising top and bottom members and wall members extending therebetween defining diverging light passageways, means extending inwardly from the outermost of said wall members providing grooves for the reception of reflectors, surface reflectors mounted within said grooves, and cooperating surface reflectors mounted upon the other of the walls of the passageways, the said passageways being in communication with a chamber providing opposing grooves which provide means for supporting a stereoscopic transparency therein, a window in said housing portion at the side of the transparency, grooves opposite the passageways for admitting light thereto, ground glass extending across said window, and wall means extending across the light passageways at the opposite ends of them, the wall means being provided with apertures for the reception of eye-piece lenses, and eye-piece lenses seated within said apertures, the walls of the diverging passageways being substantially parallel to one another, but the angle of the pairs of walls being such that the reflectors installed on the interior surfaces of the walls of the pairs cause merging of the stereoscopic images of the transparency being exhibited.

2. A device for exhibiting stereoscopic transparencies, which comprises a hollow body comprised of top and bottom members and pairs of side wall members extending therebetween and defining diverging passageways, reflector mounting means extending inwardly from the outermost of the side wall members of the respective pairs, surface reflectors carried by said mounting means, and cooperating reflectors mounted upon the other of the walls of the passageways, said passageways being in communication with a chamber providing means for supporting a stereoscopic transparency therein, a window in said chamber at the side of the transparency supporting means opposite the passageways for admitting light thereto, a light diffusion member extending across said window, and means containing eye pieces extending across the said diverging passageways at the opposite ends of them, the walls of the diverging passageways being substantially parallel to one another, with the angle between the pairs of walls being such that the reflectors installed on the interior surfaces of the walls of the pairs cause merging of the stereoscopic images of a transparency located in said transparency supporting means.

3. A device for exhibiting stereoscopic transparencies, which comprises a hollow body formed of a molded plastic material and comprising top and bottom members and pairs of wall members extending therebetween defining diverging passageways, means extending inwardly from the outermost of said wall members providing grooves for the reception of the reflectors, surface reflectors mounted within said grooves, and cooperating surface reflectors mounted on the other of the walls of the passageways, the said passageways being in communication with a chamber providing opposing grooves for supporting stereoscopic transparency therein, a window in said housing portion at the side of the transparency supporting grooves opposite the passageways for admitting light thereto, a translucent member for diffusing light extending across said window, and wall means containing eye-piece lenses extending across the said passageways at the opposite ends of them, with the walls of the diverging passageways being substantially parallel to one another, but with the angle between the pairs of walls being such that the reflectors installed on the interior surfaces of the walls of the pairs cause merging of the stereoscopic images of a transparency installed in said transparency supporting grooves.

4. A device for exhibiting stereoscopic transparencies, which comprises a hollow body comprising top and bottom members and pairs of wall members extending therebetween defining diverging passageways, means extending inwardly from the outermost of said wall members providing grooves for the reception of reflectors, surface reflectors mounted within said grooves, and cooperating surface reflectors mounted upon the other of the walls of the passageways, the said passageways being in communication with a chamber providing means for supoprting a stereoscopic transparency therein, a window in said chamber at the side of the transparency supporting means opposite the passageways for admitting light thereto, a transluscent light diffusing member extending across said window, wall means containing eye-piece lenses extending across the light passageways at the opposite ends of them, with the walls of the diverging passageways being substantially parallel to one another, but with the angle between the pairs of walls being such that the reflectors installed on the interior surfaces of the walls of the pairs cause merging of the stereoscopic images of a transparency contained in said transparency supporting means, and masking members extending into the passageways from the side walls thereof at relatively opposite ends of said reflectors and beyond the surfaces of the reflectors for preventing direct visibility through said lenses and said passageways.

5. A device for exhibiting stereoscopic transparencies, which comprises a hollow body formed of a molded plastic material comprising top and bottom members and pairs of wall members extending therebetween defining diverging passageways, means extending inwardly from the outermost of said wall members providing grooves for the reception of reflectors, surface reflectors mounted within said grooves, and cooperating surface reflectors mounted upon the other of the walls of the passageways, the said passageways being in communication with a chamber providing means for slidably supporting a stereoscopic transparency therein, the said chamber having a slot in its top wall through which a transparency slidably may be inserted, a window in said chamber at the side of the transparency supporting means opposite the passageways for admitting light thereto, a transluscent light diffusing member extending across said window, and wall means extending across the light passageways at the opposite ends of them, the said wall means containing eye-piece lenses, with the walls forming each diverging passageway being substantially parallel to one another, but with the angle of divergence of the passageways being such that the reflectors installed on the interior surfaces of the walls of the pairs cause merging of the stereoscopic images of a transparency supported in said chamber.

CHARLES D. AUSTIN.